United States Patent Office 3,044,885
Patented July 17, 1962

3,044,885
IMPREGNATED SHEETS FOR PRESERVING PERISHABLE FOODSTUFFS
Barbara F. Loehr, Camas, Wash., assignor to Crown Zellerbach Corporation, San Francisco, Calif., a corporation of Nevada
No Drawing. Filed Sept. 15, 1958, Ser. No. 760,859
13 Claims. (Cl. 99—154)

The present invention relates to preservative products adapted for use in inhibiting the development and growth of fungi or other microorganisms and to methods of producing such products. More specifically, this invention relates to the production of a specially treated carrier having a property of gradually releasing a fungicidal quantity of chlorine-containing gas thereby protecting various materials from infection or decay due to mold growth.

Although the present invention is directed to chemically treated products suitable for use in conjunction with various materials susceptible to molding or formation of microorganisms, the following description will refer specially to its adaptation in the prevention of fungal or bacterial decay on perishable foodstuffs, particularly fruits and vegetables.

Many attempts have been made to develop suitable preservative products which would protect citrus fruits and other perishable foodstuffs from spoilage due to mold growth. Many chemical compounds having either fungistatic or fungicidal properties have been tested in the treatment of fruits, but found unsatisfactory. Diphenyl is the only substance which was found valuable commercially in the prevention of rotting of citrus fruits by blue and green molds. Diphenyl has been applied to papers or various types of containers used in packaging fruits. Thus, only diphenyl has been used to any extent commercially as a fungistatic agent for the control of mold on citrus fruits during storage or shipment. However, the use of diphenyl has been recently curtailed because of its inherent unpleasant odor and unknown degree of toxicity which have been found objectionable.

Various other expedients have been suggested in the literature for the treatment of perishable foodstuffs to inhibit decay from mold spores. Such compounds include ammonia gas, unstable ammonium salts and other ammoniated compounds capable of releasing ammonia. Furthermore, attempts have been made to prevent bacterial decay on citrus fruits by means of chlorine gas, hypochlorites or hypochlorous acid, and other chlorinated organic compounds, such as chloramines. However, none of these compounds has been found successful to date in commercial use. It has been found that among those chlorinated compounds that have been investigated, there are unstable compounds, such as sodium hypochlorite and hypochlorous acid; in such compounds all of the available chlorine is released too rapidly therefrom. There are also compounds which are too stable, such as chloramines. The latter compounds, in general, are stable compounds of chlorine in the dry state, but upon contact with moisture they decompose by releasing chlorine-containing gas. However, the amount of gas released from chloramines has been found insufficient to provide an effective control in the prevention of mold growth on citrus fruit. The treatment of fruit with chlorine gas per se would have to be necessarily limited to fruits completely enclosed in sealed chambers and thus it could not be applied to the conventional procedure of handling fruits in carton boxes.

It is the principal object of the present invention to provide a new preservative product treated with an active chlorine-releasing compound, which product will be capable of inhibiting effectively the development of fungi and other microorganisms.

Another object of the invention is to provide a preservative product comprising a carrier, such as a paper product, containing special active chlorine-releasing compounds together with a novel process of making the same, such product being particularly useful for inhibiting decay of perishable foodstuffs including fruits and vegetables during their shipment and storage by insuring an effective release of chlorine gas in a manner which has not been attained heretofore with known or used fungistatic agents or processes of treatment.

Briefly, I have discovered that the above objects and other advantages are attained by treating a suitable carrier, such as a fibrous cellulosic sheet, with a solution of an active chlorine-releasing compound selected from the group consisting of chloroisocyanuric acids and salts thereof, and thereafter substantially drying the carrier. The treated carrier forms a preservative product which, when placed in contact with the materials susceptible to fungal or bacterial decay, gradually releases chlorine-containing gas in the presence of moisture in relatively small, non-toxic fungicidal quantity sufficient to protect the material from damage or decay due to mold growth. The preservative product of this invention is particularly useful when produced in the form of a sheet of paper containing the above mentioned active chlorine releasing compounds. Such treated paper may be inserted in a fruit shipping container for a gradual release of chlorine-containing gas at a controlled rate sufficient to protect the fruit from decay due to mold growth during its transit to the market. In addition, the paper product may serve as a cushioning pad to prevent damage to the fruit due to rough handling during shipment. The carrier employed in the manufacture of the herein described preservative product may be also fabricated from a variety of other materials including fibrous cellulosic sheets, textile, cloth, woven or non-woven fabrics, plastic films, etc. Preferably the carrier comprises a paper sheet, particularly a creped, bleached and absorbent paper sheet such as paper toweling.

Where paper is employed as a carrier, it should have sufficient strength to allow the treatment with a solution of the chlorine-releasing compounds. If desired, its physical characterstics may be further enhanced by the incorporation thereto of wet-strength resins, starch or other conventional additives. Particularly suitable are creped, absorbent paper sheets made from pulps bleached to approximately 80% G.E. (General Electric) brightness. The use of highly bleached paper prevents a possible loss of a certain amount of available chlorine released from the chlorinated compound due to a reaction with lignin containing constituents of the paper furnish, thereby enabling substantially all of the chlorine incorporated into the sheet to act as a fungicidal agent.

The basis weight of the paper sheet employed herein may very over a broad range of from about 10 to about 200 pounds per ream (3000 square feet). It is preferred, however, to employ sheets having a basis weight of from about 25 to about 75 lbs. per ream. If desired, the carrier may be employed in the form of shredded or otherwise comminuted paper which may be treated with a chemical solution according to this invention either prior to or after the comminuting operation.

A sheet of paper described hereinabove or any other suitable carrier is treated with a solution of an active chlorine-releasing compound by a conventional impregnation, saturation, spraying or coating procedure. The active chlorine-releasing compounds which are employed in the practice of this invention are selected from the group consisting of chloroisocyanuric acids and salts thereof. These include dichloroisocyanuric acid, trichloroisocyanuric acid and various salts of dichloroisocyanuric acid, which salts are capable of releasing gradually active chlorine gas. The preferred salts of dichloroisocyanuric acid are water-soluble salts, such as alkali metal salts, for example the sodium salt of dichlorisocyanuric acid. These compounds are characterized by being capable of releasing effective amounts of chlorine containing gas at a rate necessary and desirable for preservation of the foodstuff for a certain period of time required during its shipment and storage without causing any deleterious effect thereon. The dichloroisocyanuric acid and its salts which are capable of releasing gradually active chlorine gas are herein defined as dichloroisocyanurates, since they contain the dichloroisocyanurate anion which provides available chlorine giving the compound its properties.

In preparing a solution of any of the above mentioned compounds, water or suitable organic solvents such as benzene, ethylene chloride, cyclohexane, acrylonitrile, etc., or mixtures of water with solvents miscible therewith may be employed. However, water is the preferred solvent. The term solution as employed herein includes true solutions, colloidal suspensions and dispersions of active chlorine-releasing compounds of this invention in any of the foregoing or other suitable solvents.

It will be understood that the concentration of the active chlorine-releasing compound in the solvent must be such that the resulting solution would not damage substantially the carrier in the course of its treatment or even after it had been treated. In general, whenever possible, the maximum concentration of the chemical may be as high as that of a saturated solution. The concentration of the chemical may be increased by dissolving it in warm solvent. When water is employed as a solvent the practical temperature range is from about 20° C. to about 50° C. As the temperature of the solution exceeds 50° C., chlorine evolution from the solution increases rendering the operating conditions hazardous.

It will also be understood that the concentration of the active chlorine-releasing compound in the solution as well as its amount incorporated into the carrier may be varied as required by the end use of the preservative product and the anticipated period of time during which the product should be effective.

The carrier may be treated with the chemical solution in accordance with the present invention on any conventional equipment. Where a paper impregnator is employed, a continuous web may be passed through a bath of the chemical solution, the excess of the solution may be removed and thereafter the treated web may be substantially dried by hot air or any other suitable means until its moisture content is between about 2% and 8%. Higher moisture content in the carrier will affect the stability of the chlorinated compound and moisture contents of less than 2% may render the product too brittle. The impregnated carrier may be dried at a temperature from as low as room temperature up to about 200° C. In the case of higher temperature levels, the drying time should be limited to but a few seconds. Preferably, the drying temperature should be maintained slightly above the boiling point of the solvent employed for the chlorinated compound.

The rate of chlorine release from the finished preservative product may be controlled or varied, if desired, by addition of other chemicals or variation of humidity. These other chemicals may be incorporated in the impregnating solution containing the active chlorine-releasing compound or may be sprayed onto the carrier after it has been impregnated with the active chlorine-releasing compound. Also, if desired, a multi-sheet system may be employed, whereby one or more sheets containing the active chlorine-releasing compound is placed in contact with another sheet or sheets treated with a suitable chemical capable of varying the rate of release of chlorine. Example of such chemicals are sodium salts, such as sodium chloride, sodium sulfate, sodium carbonate, sodium hydrogen phosphate; potassium salts; ammonium salts, such as ammonium sulfate; ammonium hydroxide, and other bases such as sodium hydroxide, or acids.

Although the composition of the gas released in the presence of moisture from the chlorinated compounds according to this invention has not been ascertained, such gas contains essentially chlorine. The rate of release of the chlorine-containing gas from the preservative product may be controlled by adjustment of the pH of the impregnating solution. However, in general, it is believed that impregnating solutions of a slightly acidic character are the most suitable in the practice in the present invention.

After the preservative product has been substantially dried, as described hereinabove, it is desirable that it be protected from moisture until it is employed as a fungicidal medium. This may be accomplished by wrapping the product in a moisture/vapor resistant wrapper, preferably inert to the action of the released gas. A sheet of bleached paper may be placed between the wrapper and the preservative product, if necessary, in order to avoid a reaction between active chlorine and certain constituents of the wrapper.

When the finished preservative product, such as a sheet of paper, is to be used for inhibiting mold growth on citrus fruit and the like, it is placed in a suitable container either ventilated or non-ventilated, such as a carton, preferably in such a manner that it will form a lining for at least one inner wall of the container. The chlorine-containing gas will be gradually released from the preservative product under the influence of moisture in the air. In a very dry climate, it may be desirable to spray or otherwise moisten the preservative product prior to its placing in the container together with the fruit to be shipped, or after the fruit has been packed. It will be understood that the amount of active chlorine released from the preservative product can be controlled by varying the number of sheets placed in a container. This amount will depend on the nature of the foodstuff to be preserved and its susceptibility to decay caused by molds.

The following are specific examples of the carrying out of the present invention. It is to be understood, of course, that the invention is not limited entirely to these specific examples.

EXAMPLE I

A web of creped kraft paper having a brightness of 80% G.E., a basis weight of 25 lbs. per ream and made of a pulp furnish comprising a mixture of bleached softwoods and hardwoods was impregnated with a 43% aqueous solution of sodium dichloroisocyanurate (sodium salt of dichloroisocyanuric acid). The solution was prepared at 50° C. and maintained at approximately this temperature during impregnation. The pH of the solution was 5.8 at 50° C. The excess of the impregnating solution was squeezed out and the web was substantially dried in a hot air oven at a temperature ranging from about 100° C. to 135° C. for about 1.5 minutes to a moisture content of 3.6%. The impregnating conditions were so adjusted that the final sheet contained 19 lbs. per ream of sodium dichloroisocyanurate, corresponding to 5.7 lbs. per ream of active chlorine, dry fiber basis. The treated paper was subsequently cut to produce 11 x 17 inch sheets. Standard non-ventilated cartons were lined with four chlorine-releasing sheets by placing two sheets one layer of fruit from the bottom and two sheets one layer of fruit from the top of the carton. The fruits used were lemons, about 25% of which were injured by scratching and then inoculated by pumping spores of green mold into the air over the fruit. As a control, the same fruits were packed in the same manner but without the preservative sheets. The cartons were closed and stored for 7 days in a 58° F. room, followed by a 4 day storage at a temperature of about 80° F.

Following the above period of storage, the fruits were examined for decay due to molding. The following Table 1 shows the results obtained.

Table 1

| | Percent decay |
|---|---|
| Control cartons | 78.2 |
| Cartons containing chlorine-releasing sheets | 35.0 |

EXAMPLE 2

The chlorine-releasing compound and the procedure employed in making the preservative sheets were substantially the same as in Example 1, except that sufficient sodium dichloroisocyanurate was dissolved in water to produce a solution containing 15% of the salt. The temperature of the solution was 25° C. and the pH was 5.4. The impregnated paper was dried at a temperature of about 125° C. for about 1.5 minutes to a moisture content of about 5%. The impregnating conditions were so adjusted that the final paper contained 8.3 lbs. per ream of the chlorine-releasing compound, corresponding to 2.5 lbs. of active chlorine per ream, dry fiber basis.

Navel oranges were all injured and inoculated in a manner similar to that described in Example 1. Thereafter they were packed in standard ventilated cartons using four treated sheets in each carton by placing two sheets on the bottom and two sheets on the top of the fruits after they have been packed. The sealed cartons were stored for 13 days in a 58° F. room, 1 day in a 45° F. room and finally 3 days at 70° F. The examination of the packed fruit after the above period of storage gave the following results as shown in Table 2.

Table 2

| | Percent decay |
|---|---|
| Control cartons | 57.9 |
| Cartons containing chlorine-releasing sheets | 22.1 |

The same treated sheets were also employed in the preservation of lemons which were injured and inoculated as described in Example 1, by placing two chlorine-releasing sheets at the top, one sheet at the bottom of the carton, and three sheets between layers of lemons. As a control, the same lemons were packed in cartons without treated sheets. The cartons were stored for 2 weeks at 58° F. and thereafter for 3 days at room temperature.

The results obtained are given in Table 2a.

Table 2a

| | Percent Decay | |
|---|---|---|
| | Ventilated Cartons | Non-Ventilated Cartons |
| Control cartons | 46.2 | 58.9 |
| Cartons with 2 chlorine-releasing sheets | 22.9 | 27.3 |
| Cartons with 3 chlorine-releasing sheets | 14.8 | 9.0 |

EXAMPLE 3

Creped paper made from unbleached kraft pulp having a basis weight of 30 lbs. per ream was impregnated in the manner described in Example 1 with a 12% aqueous solution of sodium dichloroisocyanurate. The temperature of the solution was 25° C. and its pH was adjusted with sodium hydroxide to 8.4. The impregnated paper was dried at a temperature range between 100° C. and 140° C. for about 1.5 minutes to a moisture content of about 4%. The amount of the chemical incorporated into the sheet was 7.4 lbs. per ream, corresponding to 2.2 lbs. of active chlorine per ream, dry fiber basis.

Valencia oranges were injured and inoculated as described in Example 1, then packed into ventilated cartons containing no treated sheets as a control and into ventilated cartons whereby four chlorine-releasing sheets were placed in each carton, two on top and one on each side thereof. The cartons were stored for 14 days at 72° F. and 90% relative humidity.

Table 3

| | Percent decay |
|---|---|
| Control cartons | 68.5 |
| Cartons with 4 chlorine-releasing sheets | 9.3 |

EXAMPLE 4

The same paper as employed in Example 1 was impregnated with a solution containing 14% of the sodium salt of dichloroisocyanuric acid, the pH of which was adjusted with sodium carbonate to 7.6. The temperature of the solution during impregnation was 25° C. After impregnation the paper was dried at a temperature range between 105° C. and 145° C. for 1.5 minutes to a moisture content of about 5%. The treated sheet contained 6.0 lbs. of the chemical per ream, corresponding to 1.8 lbs. of active chlorine per ream, dry fiber basis.

Lemons which have been injured and inoculated in the same manner as explained in Example 1 were packed in three sets of cartons having (a) no treated paper, (b) six sheets of treated paper placed on the top, between lemon layers and at the bottom of the carton, and (c) twenty sheets which have been shredded, the shredded pieces filling the voids in the cartons around the fruit. The cartons were stored for 10 days at 58° F. and for 4 days at room temperature.

The results obtained are given in Table 4.

Table 4

| | Percent decay |
|---|---|
| Control cartons | 91.0 |
| Cartons containing 6 sheets | 34.0 |
| Cartons containing 20 shredded sheets | 18.5 |

The following working examples further illustrate other embodiments of the present invention.

EXAMPLE 5

Two heads of lettuce were placed in a sealed polyethylene bag together with two sheets of he paper employed in Example 2. Two other heads of letture were packaged in the same manner but without the treated paper. The bags were stored at a temperature of 72° F. of 10 days.

At the end of this period the control lettuce was very slimy and its stem ends were soft and mushy, whereas lettuce stored in the presence of preservative pads had no visible slime and its stem ends were firm.

EXAMPLE 6

The materials and the procedure of Example 5 were repeated, except that bunches of carrots were employed instead of lettuce. Packaged carrots were stored for 10 days at a temperature of 72° F. At the end of this period the untreated carrots had a considerable amount of deep watery rot, whereas the treated carrots had only a small amount of a dry and shallow rot.

The following examples illustrate other procedures of preparing preservative products in accordance with the present invention.

EXAMPLE 7

Creped kraft paper having a 80% G.E. brightness and 30 lbs. per ream basis weight is impregnated with a 2% solution of dichloroisocyanuric acid in water, then dried at 110° C. to a moisture content of about 5%. The treated paper contains 3 lbs. of dichloroisocyanuric acid, corresponding to about 1 lb. of active chlorine per ream of paper, dry fiber basis. The treated paper is suitable for preservation of various types of perishable foodstuffs.

EXAMPLE 8

Creped kraft paper having 80% G.E. brightness and 10 lbs. per ream basis weight is impregnated with 1% solution of trichloroisocyanuric acid in water, then dried at 110° C. to a moisture content of about 6%. The amount of trichloroisocyanuric acid incorporated into the sheet is 0.5 lb. per ream, corresponding to 0.2 lb. of active chlorine per ream, dry fiber basis. The treated paper is useful for inhibiting the development of fungi on perishable foodstuffs.

EXAMPLE 9

Kraft paper having 80% G.E. brightness and 100 lbs. basis weight per ream is treated with a 30% solution of sodium dichloroisocyanurate in water, then dried at 125° C. to a moisture content of 5%. The amount of chemical incorporated into the paper is 150 lbs. per ream, corresponding to 45 lbs. of active chlorine per ream, dry fiber basis. The resulting paper contains a high amount of active chlorine and is very useful in the preservation of perishable foodstuffs where a storage of long duration is required.

EXAMPLE 10

White cotton gauze weighing 30.5 grams per square yard is impregnated with a 3% solution of trichloroisocyanuric acid in benzene, then dried at a temperature of 85° C. The treated gauze contains 3.8 grams of the chlorine-releasing compound per square yard, corresponding to 1.6 grams of active chlorine per square yard, dry basis. The treated gauze is suitable for preventing the development of fungi on foodstuffs, as well as for conversion into surgical pads, bandages and the like.

EXAMPLE 11

White, non-woven orlon material having 55 lbs. per ream basis weight is impregnated with 0.1% solution of dichloroisocyanuric acid in 1,2-dichloroethane, then dried at a temperature of 85° C. The amount of dichloroisocyanuric acid incorporated into the material is 0.43 lb. per ream, corresponding to 0.15 lb. of active chlorine per ream, dry material basis. The treated product is useful in sanitary applications.

EXAMPLE 12

A polyethylene film is sprayed with a 2% solution of trichloroisocyanuric acid in 1,2-dichloroethane to impart 0.97 gram of the chemical per square yard of the film, corresponding to 0.41 gram of active chlorine per square yard, dry basis. The resulting film is suitable for packaging produce.

EXAMPLE 13

The same paper as described in Example 1 was impregnated with a 26% aqueous solution of sodium chloride. The temperature of the solution was 50° C. The procedure employed was the same as in Example 1. The treated paper had a moisture content of about 5% and contained 17 lbs. per ream of sodium chloride. The paper was subsequently cut into 11 x 17 inch sheets.

Standard non-ventilated cartons were lined with two sodium chloride treated sheets and four chlorine-releasing sheets prepared as described in Example 1, by inserting one sodium chloride treated sheet between two chlorine-releasing sheets and placing the assembly one layer of fruit from the bottom and a similar assembly one layer of fruit from the top of the carton. The fruit and the storage procedure were the same as described in Example 1.

Table 5 hereinbelow shows the results obtained.

*Table 5*

| | Percent decay |
|---|---|
| Control cartons | 78.2 |
| Cartons containing chlorine-releasing and sodium chloride treated sheets | 30.0 |

EXAMPLE 14

The same paper as described in Example 1 was impregnated with an aqueous solution containing 30% sodium carbonate and 0.25% sodium alginate by weight. The temperature of the solution was 50° C. The impregnating procedure employed was the same as in Example 1. The resulting paper had a moisture content of 4% and contained 19 lbs. per ream of sodium carbonate. The treated paper was subsequently cut into 11 x 17 inch sheets. Standard non-ventilated cartons were employed for packing and storing lemons following the procedure of Example 1. Two assemblies each containing one sodium carbonate-treated sheet inserted between two chlorine-releasing sheets prepared as described in Example 1 were placed in each carton in the manner set forth in Example 13.

The following Table 6 shows the results obtained.

*Table 6*

| | Percent decay |
|---|---|
| Control cartons | 78.2 |
| Cartons containing chlorine-releasing and sodium carbonate treated sheets | 11.9 |

EXAMPLE 15

The same paper as described in Example 7 was coated with a 33⅓% pasty dispersion of sodium dichloroisocyanurate in water, then dried at 100° C. for three minutes. This resulted in a treated sheet having a major proportion of the chemical deposited on one side thereof. The treated sheet contained 31.2 lbs. of sodium dichlorisocyanurate per ream, corresponding to 9.4 lbs. per ream of active chlorine, dry fiber basis, and is suitable for preservation of fruits and vegetables.

From the above examples, it is apparent that the preservative products of this invention are highly satisfactory for inhibiting the development of fungi on various materials susceptible to the development thereof, and in particular to citrus fruits and other perishable foodstuffs. The superior fungicidal characteristics of the preservative product of this invention give them a long sought property of gradually releasing active chlorine-containing gas in the presence of moisture, thus reducing very markedly formation of undesirable molds during the storage or shipping of foodstuffs. Furthermore, the active chlorine-releasing compounds of this invention empoyed in the concentrations and amounts hereinabove described are believed to be non-toxic and to give adequate protection for most requirements.

Having thus described my invention, I claim:

1. As a new article of manufacture, a preservative product for inhibiting the development of fungi comprising a base sheet carrier treated with an active chlorine-releasing compound selected from the group consisting of dichloroisocyanurates and trichloroisocyanuric acid, said compound being present in said carrier in an amount sufficient to gradually release chlorine-containing gas in the presence of moisture over a period of at least a few days.

2. The product of claim 1 wherein the carrier comprises a fibrous cellulosic sheet.

3. The product of claim 1 wherein the carrier comprises absorbent, bleached paper.

4. The product of claim 1 wherein the chlorine-releasing compound comprises an alkali metal dichloroisocyanurate.

5. The product of claim 1 wherein the chlorine-releasing compound comprises sodium dichloroisocyanurate.

6. The product of claim 1 wherein the chlorine-releasing compound comprises dichloroisocyanuric acid.

7. The product of claim 1 wherein the chlorine-releasing compound comprises trichloroisocyanuric acid.

8. A preservative paper product for inhibiting decay of perishable foodstuffs including fruits and vegetables comprising bleached and absorbent paper containing a compound selected from the group consisting of dichloroisocyanurates and trichloroisocyanuric acid, said compound releasing gradually a fungicidal quantity of chlorine-containing gas in the presence of moisture over a period of at least a few days.

9. A paper product for inhibiting decay of citrus fruits during shipment and storage comprising substantially dry, creped, bleached and absorbent paper containing distributed therein a compound selected from the group consisting of dichloroisocyanurates and trichloroisocyanuric acid, said compound releasing gradually a fungicidal quantity of chlorine-containing gas in the presence of moisture over a period of at least a few days without causing injury to said fruits.

10. A preservative product for inhibiting the development of fungi on perishable foodstuffs comprising a fibrous cellulosic sheet treated with an active chlorine-releasing compound selected from the group consisting of dichloroisocyanurates and trichloroisocyanuric acid thereof and another cellulosic sheet in contact therewith treated with a chemical adapted to vary the rate of release of chlorine from said compound.

11. The product of claim 10 wherein said chemical comprises a sodium salt.

12. The product of claim 10 wherein said chemical comprises an ammonium salt.

13. The product of claim 10 wherein said chemical comprises ammonium sulfate.

References Cited in the file of this patent

UNITED STATES PATENTS

| | | |
|---|---|---|
| 2,184,886 | Muskat | Dec. 26, 1939 |
| 2,184,888 | Muskat | Dec. 26, 1939 |
| 2,480,010 | Flett | Aug. 23, 1949 |
| 2,607,738 | Hardy | Aug. 19, 1952 |
| 2,728,767 | Wolf | Dec. 27, 1955 |
| 2,913,460 | Brown | Nov. 17, 1959 |

UNITED STATES PATENT OFFICE

CERTIFICATE OF CORRECTION

Patent No. 3,044,885                                            July 17, 1962

Barbara F. Loehr

It is hereby certified that error appears in the above numbered patent requiring correction and that the said Letters Patent should read as corrected below.

Column 2, line 56, for "very" read -- vary --; column 3, line 32, after "solvent", second occurrence, insert a comma; column 5, Table 2a, second column, line 1 thereof, for "46.2" read -- 46.3 --; column 6, line 37, for "he" read -- the --; line 38, for "letture" read -- lettuce --; line 40, for "of" read -- for --; column 8, line 13, for "78,2" read -- 78.2 --; column 9, line 10, strike out "thereof".

Signed and sealed this 13th day of November 1962.

(SEAL)
Attest:

ERNEST W. SWIDER
Attesting Officer

DAVID L. LADD
Commissioner of Patents